United States Patent [19]

du Quesne

[11] Patent Number: 4,919,184

[45] Date of Patent: Apr. 24, 1990

[54] LEVER FOR REMOVING MOTORCAR TIRES

[76] Inventor: Francis du Quesne, Kleistraat 138, 2630 Aartselaar, Belgium

[21] Appl. No.: 322,311

[22] Filed: Mar. 13, 1989

[30] Foreign Application Priority Data

Mar. 14, 1988 [BE] Belgium ............................. 8800290

[51] Int. Cl.⁵ ........................................... B60C 25/04
[52] U.S. Cl. .................................................. 157/1.3
[58] Field of Search ......................................... 157/1.3

[56] References Cited

U.S. PATENT DOCUMENTS 2,565,216 8/1951 Fox .................................. 157/1.3 X

FOREIGN PATENT DOCUMENTS 908320 9/1944 France .................................. 157/1.3
669087 2/1952 United Kingdom ................. 157/1.3

Primary Examiner—James G. Smith
Attorney, Agent, or Firm—William A. Drucker

[57] ABSTRACT

The lever comprises a support in the form of an inverted angle iron in which the horizontal part is curved and bears on the cheek of the tire being removed and the vertical part bears on the tire bead and the wheel rim, said vertical part being extended by a hooking element meant for insertion between the tire bead and the wheel rim so that the tire can be removed, an arm fixed at an angle to the vertical plane on the horizontal part of said support, and a grip fixed to the end of said arm.

7 Claims, 2 Drawing Sheets

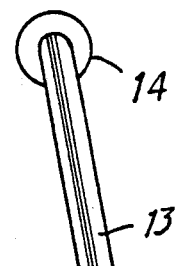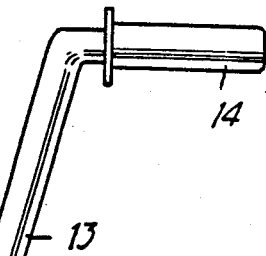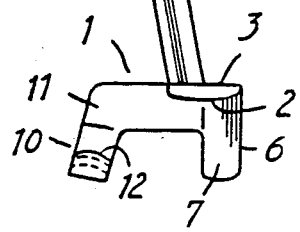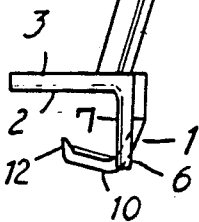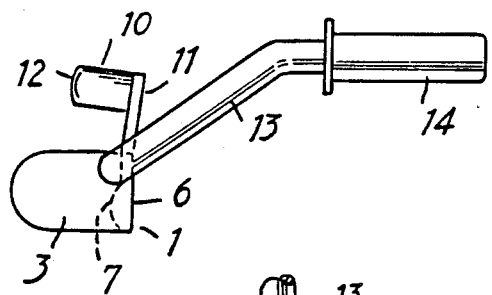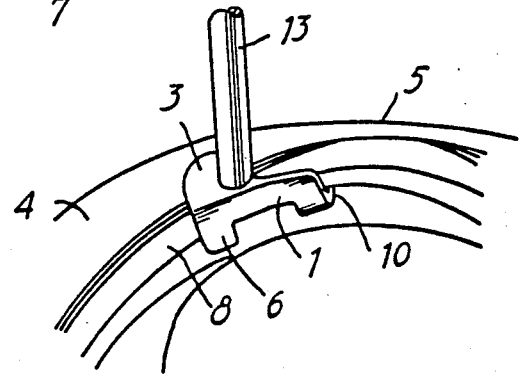

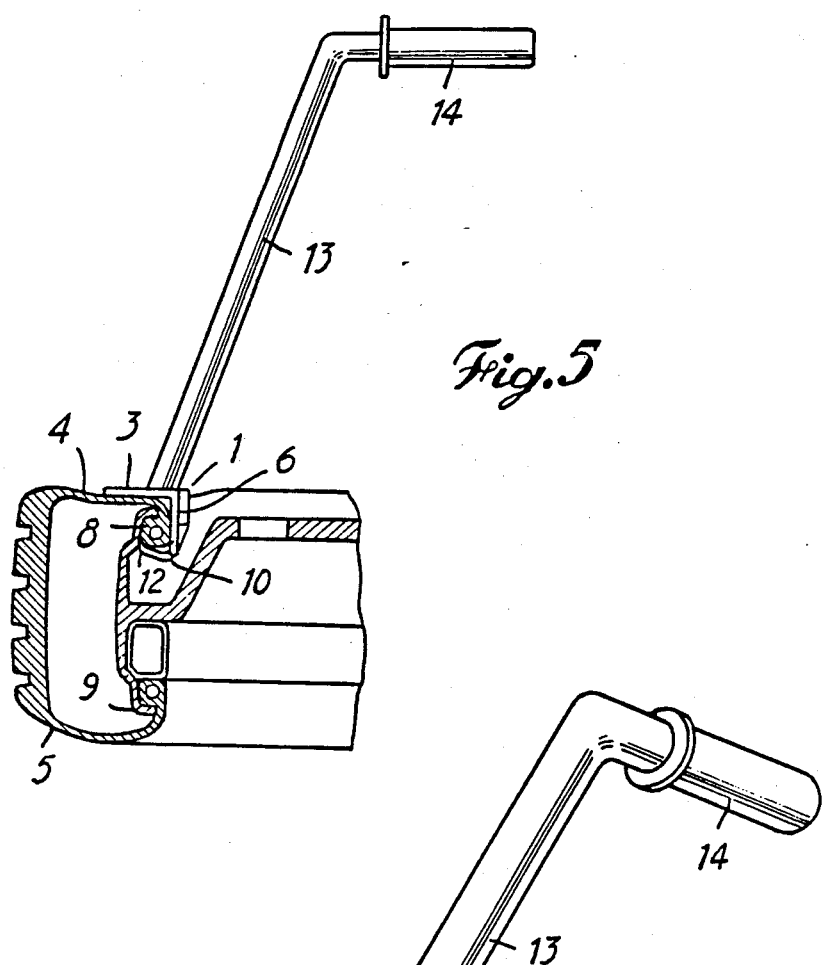

LEVER FOR REMOVING MOTORCAR TIRES

The invention is for a lever for removing tires from motorcar wheels with in particular a special section and by means of which it is possible to remove tires quickly, easily and with a single movement of the lever.

With this type of tires and wheels, the tire is mounted over the rim, as shown in transverse section in FIG. 5 of the attached drawings, so that the wheel rim is invisible.

Even so a device is known for the removal of tires of this type but this device consists of a mechanism with several pivoting arms. This device, however, has the disadvantage that it is of a complicated construction, expensive and it easily becomes defective.

With a view to eliminating these drawbacks, a simple lever has been realized which makes it possible to dismantle the tire by a single movement.

Pursuant to the essential characteristic of this lever according to the invention, it comprises a support with an inverted angle iron shape of which the horizontal part bears on the cheek of the tire being removed and the vertical part bears on the tire bead and the wheel rim, said vertical part having an extension in the form of a hooking element for insertion between the tire bead and the wheel rim in order to remove the tire, a lever arm fixed at an angle to the vertical plane on the horizontal part of said support, and a grip mounted on the end of said arm.

By way of example and without in any way being exhaustive, a description of a preferred embodiment of the lever in accordance with the invention is given below. This description refers to the attached drawings where:

FIG. 1 is a front view of the lever;
FIG. 2 is a side view of the lever;
FIG. 3 is a plan view of the lever;
FIG. 4 is a perspective view of the lower part of the lever inserted between the tire and the wheel rim;
FIG. 5 is a partial cross section of a wheel rim and tire which is to be removed, where the lever is shown in the operating position;
FIG. 6 is a perspective view of the lever.

In these figures it can be seen that the lever comprises a support 1 in the form of an inverted angle iron in which the lower surface 2 of the horizontal part 3 is curved and is meant to bear on the cheek 4 of the tire 5 being removed. The vertical part 6 of the support 1 has a curved surface 7 which bears on the tire bead 8 of the tire 5 and the wheel rim 9 during the removal of the tire. The vertical part 6 is extended by a hooking element 10 meant for insertion between the bead 8 of the tire 5 and the wheel rim 9 so that the tire can be removed. This hooking element has a vertical back 11 and a projecting insertion lip 12 which is set at an angle to aforesaid back 11 (FIG. 2). The inner surface of the insertion lip 12 is slightly curved, in such a way that the tire bead can slide without difficulty over aforesaid surface. In the vertical plane and seen from above the hooking element 10 is positioned at an angle to its back 11 (FIG. 3). Welded to the horizontal part 3 of the support 1 at an angle to the two vertical planes perpendicular to one another, there is an arm 13 the free end of which is provided with a grip 14, which by preference is positioned at an angle to said arm.

To remove a tire, the hooking element 12 of the lever is inserted between the wheel rim 9 and the tire bead 8, in such a way that the horizontal part 3 of the lever is positioned on the cheek 4 of the tire 5 and the vertical part 6 rests against the tire bead 8 of the tire (FIG. 5), after which traction is exerted on the grip 14 and the arm 13. During the single movement of the lever, the hooking element 12 tilts with respect to the horizontal part 3 bearing on the cheek 4 of the tire 5 inserting itself under the tire bead 8 of the tire, while at the same time, the hooking element 12 also tilts with respect to the vertical part 6 bearing on the bead 8 of the tire 5 thus pulling the bead 8 of the tire outside and over the wheel rim 9. It is then sufficient to remove the lever and subsequently remove the tire by hand.

It goes without saying that the lever and its parts may be of any shape and dimensions whatsoever.

I claim:

1. A lever for the removal of a tire from a wheel rim of a motorcar wheel having a tire cheek and a tire bead, said lever comprising: a support with an inverted angle-iron shape having a horizontal part cooperating with the tire cheek and a vertical part cooperating with the tire bead and the wheel rim, said vertical part being extended by a hooking element insertable between the tire bead and the wheel rim for removing the tire, an arm fixed at an angle in a vertical plane on the horizontal part of said support, and a grip fixed to the end of said arm.

2. Lever as defined in claim 1, in which the arm is positioned on the horizontal part of the support at an angle to two vertical planes perpendicular to one another.

3. Lever as defined in claim 1, in which the hooking element has a vertical back and a projecting insertion lip which is set at an angle to said back.

4. Lever as defined in claim 1, in which in the vertical plane, the hooking element is positioned at an angle with respect to its back.

5. Lever as defined in claim 1, in which seen from above, the hooking element is positioned at an angle with respect to the support.

6. Lever as defined in claim 1, in which the lower surface of the horizontal part, the inner surface of the vertical part and the inner surface of the hooking element, are curved.

7. Lever as defined in claim 1, in which the grip is positioned at an angle at the end of the arm and is parallel to the horizontal part of the support.

* * * * *